(12) United States Patent
Ogita et al.

(10) Patent No.: US 6,348,553 B1
(45) Date of Patent: Feb. 19, 2002

(54) COMPOSITION FOR BAKING FINISH

(75) Inventors: Takashi Ogita; Takao Matsuyoshi; Yoshihiko Miyamori; Hirotsugu Mano, all of Kyoto (JP)

(73) Assignee: Matsui Chemical Co., Ltd., Kyoto (JP)

( * ) Notice: Subject to any disclaimer, the term of this patent is extended or adjusted under 35 U.S.C. 154(b) by 0 days.

(21) Appl. No.: 09/539,890

(22) Filed: Mar. 31, 2000

(30) Foreign Application Priority Data

Jul. 19, 1999 (JP) .............................. 11-205143

(51) Int. Cl.$^7$ .............................. C08F 126/06
(52) U.S. Cl. .................. 526/261; 526/263; 526/320; 526/328; 526/328.5; 526/329.6; 526/333; 526/334
(58) Field of Search ................. 526/261, 263, 526/320, 328, 328.5, 329.6, 333, 334

(56) References Cited

U.S. PATENT DOCUMENTS

| | | | |
|---|---|---|---|
| 3,020,255 A | 2/1962 | Magrane et al. | |
| 4,230,550 A | 10/1980 | Vincent | |
| 4,230,740 A | 10/1980 | Moyer | |
| 5,646,213 A | * 7/1997 | Guo | ............ 524/562 |
| 6,168,865 B1 | * 1/2001 | Koster et al. | ............ 428/418 |

FOREIGN PATENT DOCUMENTS

| | | |
|---|---|---|
| JP | 64-6943 | 1/1989 |
| JP | 3-153768 | 7/1991 |
| JP | 8-211607 | 8/1996 |
| JP | 10-88068 | 4/1998 |
| WO | WO 98/12272 | * 3/1998 |

* cited by examiner

Primary Examiner—Helen L. Pezzuto
(74) Attorney, Agent, or Firm—Oblon, Spivak, McClelland, Maier & Neustadt, P.C.

(57) ABSTRACT

To provide a composition for coating or printing for baking finish which assures a small amount of misting and excellent physical properties of a coating film such as mechanical strength, water resistance, solvent resistance and adhesiveness. The composition comprises a benzoguanamine compound having at least one radically polymerizable double bond and a polymerizable functional group in its molecule and as the case demands, a radically polymerizable (meth) acrylate compound.

9 Claims, 1 Drawing Sheet

COMPOSITION FOR BAKING FINISH

TECHNICAL FIELD OF THE INVENTION

The present invention relates to a composition useful for coating and printing for baking finish, particularly a coating composition and printing ink composition for baking finish on an outer surface of a can.

BACKGROUND OF THE INVENTION

For application to an outer surface, particularly application to an outer surface of a can, a thermosetting organic solvent coating composition or aqueous coating composition or a radiation crosslinking coating composition has been used.

A thermosetting organic solvent coating composition is excellent from the point that since an organic solvent has a high diluting ability, solid components having properties necessary for application on an outer surface of a can are easily blended in the composition, particularly from the point that a coating film excellent in water resistance and retort resistance can be formed. However there is a fear that at the time of application and baking, a great amount of solvent is released into an atmosphere, which results in environmental pollution, i.e., contamination of atmosphere, and besides that, solvent resistance of the obtained film is not enough since a resin thereof has lipophilic property. Also since such a coating composition is a hazardous material, sufficient control against fires is required.

A thermosetting aqueous coating composition is a non-hazardous material. Therefore it is easy to handle from the viewpoint of fire, and is excellent from the point that there is less possibility of causing contamination of atmosphere at the time of application. However much energy and time are required for baking, and since a resin thereof is hydrophilic, water resistance and retort resistance of the obtained coating film are not sufficient.

Those organic solvent coating composition and aqueous coating composition are usually applied on a can by roll coating method. In that case, since a resin content (solid content) in the coating composition is small, in order to obtain a desired coating thickness, it is necessary to apply much amount of coating composition on an outer surface of a can. However as a coating amount increases, a scattering amount of coating composition (called "misting") also increases, which causes problems that working environment is deteriorated and inner and outer surfaces of the can are stained.

On the other hand, radiation (ultraviolet ray) crosslinking coating composition itself is substantially solid after reaction, and therefore is excellent in that a scattering amount is small at the time of application and there is less possibility of causing contamination of atmosphere. However since a coating film shrinks at the time of curing, adhesion to a can and processability or dimensional stability are not sufficient, and besides that, curing of a coating film is insufficient only by curing with radiation and further baking step is required. Also an expensive curing catalyst which has radiosensitivity is necessary, and thus an increase in cost of coating composition itself is resulted.

For example, in U.S. Pat. No. 4,230,740, a photo curable composition comprising a melamine (meth)acrylate resin having six reactive double bonds is disclosed, and in U.S. Pat. No. 4,230,550, a photo curable coating comprising a melamine acrylate resin having three methoxymetyl groups is disclosed. However since those melamine (meth)acrylate resins have many reaction moieties (crosslinking points), a crosslinking density becomes high, which results in a hard and fragile coating film.

Further a polymerizable melamine (meth)acrylate resin is disclosed in U.S. Pat. No. 3,020,255. However a chain length of an acrylate portion of that melamine (meth)acrylate is short (the number of carbon atoms does not exceed 4), and a change in its properties easily occurs. Also an elongation of an obtained coating film is small and there is a case where cracking of a coating film occurs when processing a coated article.

An object of the present invention is to solve the above-mentioned problems and provide a composition for coating and printing for baking finish which has the following advantages.

(1) Application by roll coating method and printing by using a block material for printing are possible, and a coating amount can be reduced to a minimum, thus making it possible to inhibit an amount of a composition scattering from a roll or block material to a minimum and minimize deterioration of working environment and contamination of printed article, particularly contamination of inner and outer surfaces of a can.

(2) The composition contains neither organic solvent nor water or contains only a small amount thereof, and therefore almost all the components of the composition become substantially solid after thermosetting and no energy or only a small amount of energy is required for evaporating the solvent.

(3) A coating film excellent in solvent resistance, water resistance, abrasion resistance and scratch resistance can be formed.

(4) An expensive curing catalyst is not used or its amount is decreased greatly.

SUMMARY OF THE INVENTION

The present invention relates to the composition for coating and printing for baking finish, which contains a specific benzoguanamine compound (A) having a radically polymerizable double bond and condensation-polymerizable functional group in its molecule and a radically polymerizable compound (B) which is a specific modified (meth)acrylate.

The compound (A) comprises one or two or more compounds represented by the formula (I):

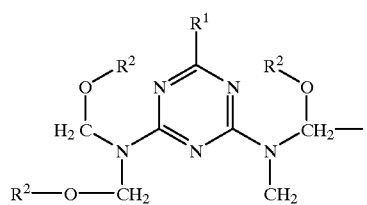

(I)

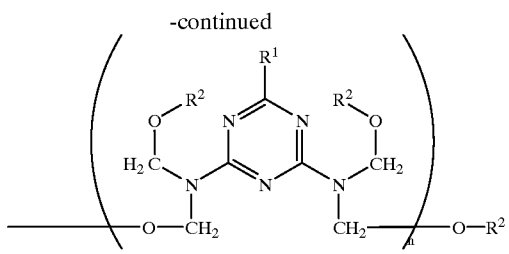

wherein $R^1$ is phenyl; $R^2$ is H, an alkyl group having 5 to 18 carbon atoms, cyclohexyl, phenyl or $R^3$, $R^4$ or $R^5$ described below; n is 0 or an integer of 1 to 3; provided that at least one of $R^2$ in one molecule is $R^3$, $R^4$ or $R^5$, in which $R^3$ is a group represented by the formula (1):

$$-X-OCO-CY=CH_2 \qquad (1)$$

in which Y is H or $-CH_3$; X is an alkylene group having 5 to 18 carbon atoms and a part or a whole of its hydrogen atoms may be substituted by halogen atom, $R^4$ is a group represented by the formula (2):

$$-(V-O)_m-Z-OCO-CY=CH_2 \qquad (2)$$

in which Y is as defined above; each of V and Z is a linear or cyclic alkylene group having 2 to 8 carbon atoms and a part or a whole of its hydrogen atoms may be substituted by halogen atom, m is an integer of 1 to 20, and $R^5$ is a group represented by the formula (3):

$$-(W-COO)_p-Z-OCO-CY=CH_2 \qquad (3)$$

in which Y and Z are as defined above; W is a linear or cyclic alkylene group having 3 to 8 carbon atoms and a part or a whole of its hydrogen atoms may be substituted by halogen atom, p is an integer of 1 to 8.

The radically polymerizable modified (meth)acrylate compound (B) is (1) an alkyleneoxide-modified (meth)acrylate prepared by reacting (meth)acrylic acid with an alcohol having ethyleneoxide or propyleneoxide adduct, a carboxyalkylester-modified (meth)acrylate prepared by reacting a carboxyalkyl (meth)acrylate with an alcohol, an epoxy-modified (meth)acrylate prepared by reacting acrylic acid or methacrylic acid with epoxy group of glycidyl ether of an alcohol, a (meth)acrylate having urethane bond and prepared by reacting a (meth) acrylate having hydroxyl with a compound having isocyanate group at its end or a mixture thereof; or (2) a (meth)acrylate-modified epoxy resin prepared by reacting (meth)acrylic acid with an epoxy resin, a (meth)acrylate-modified epoxy resin prepared by reacting (meth)acrylic acid with the epoxy resin modified by the above-mentioned alkyleneoxide or carboxyalkyl, a (meth)acrylate prepolymer or polymer having urethane bond and prepared by reacting a (meth)acrylate having hydroxyl with a compound having isocyanate group at its end, a (meth)acrylate-modified polyester prepared by reacting (meth)acrylic acid with a polyester, or a mixture thereof.

It is preferable that the compound (A) is the compound represented by the formula (I), in which 1 to 5 of $R^2$ is one or two or more of $R^3$, $R^4$ or $R^5$.

Further it is preferable that the compound (A) is a benzoguanamine acrylate resin, in which in the formula (I), Y in $R^3$, $R^4$ or $R^5$ is H; and a benzoguanamine methacrylate resin, in which in the formula (I), Y in $R^3$, $R^4$ or $R^5$ is $CH_3$.

It is preferable that the composition of the present invention contains an initiator exhibiting a catalytic ability in the condensation polymerization and/or an initiator exhibiting a catalytic ability in the radical polymerization, and that no solvent is contained (solvent-less) or its amount is as small as not more than 20% by weight (composition of high solid content). Also a reactive additive may be contained in the composition.

The composition of the present invention is for baking finish and is used as a coating composition for baking finish when coated and as a printing composition for baking finish when printed. There is no substantial difference between the coating for baking finish and the printing for baking finish except that in the latter case of printing, letters and patterns are formed partly by using a block material for printing. Therefore the following explanation is made with respect to the former coating composition for baking finish unless otherwise noted.

DETAILED DESCRIPTION

Figure 1:
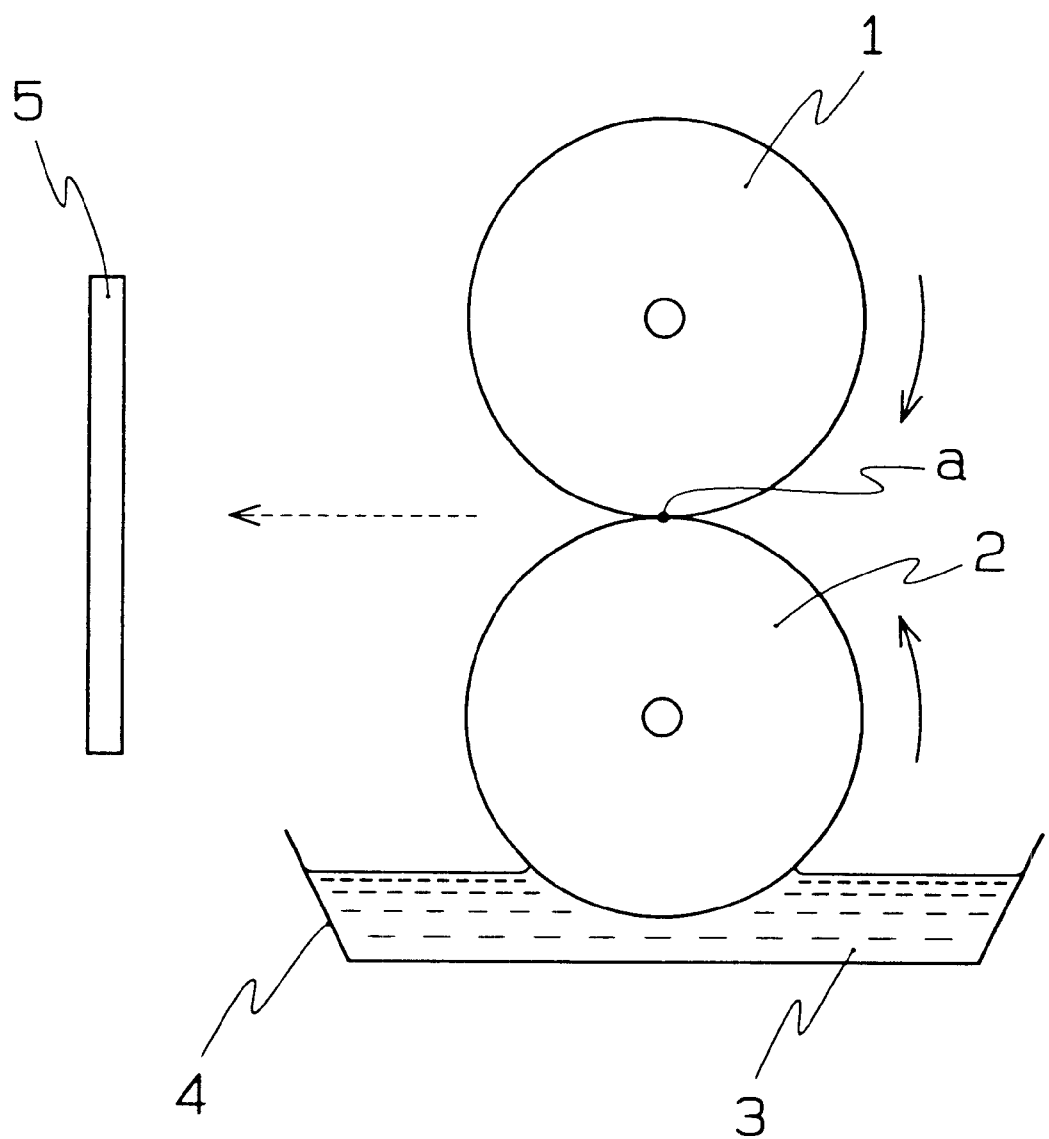
FIG. 1 is a diagrammatic view of a device used for measuring an amount of misting in examples and comparative examples.

The coating composition of the present invention comprises the compound (A) having a radically polymerizable double bond and condensation-polymerizable functional group in its molecule. The radically polymerizable double bond of the compound (A) functions to make a molecular weight higher in the radical polymerization reaction between the compounds (A) or between the compound (A) and the radically polymerizable (meth)acrylate compound (B), and the condensation-polymerizable functional group functions to make a molecular weight higher through condensation reaction by dehydrating, dealcoholation or transesterification of the compound (A). By a combination of those functions, effects of making a molecular weight higher and of advancing three-dimensional polymerization network formation can be obtained.

Since the above-mentioned $R^1$ is phenyl, a crosslinking density can be decreased and a flexible coating film can be obtained. Preferred $R^2$ are H, an alkyl group having 5 to 18 carbon atoms, cyclohexyl, phenyl, $R^3$, $R^4$ or $R^5$. In the case of an alkyl group, one having 6 to 10 carbon atoms is preferred from the viewpoint of a good balance between reactivity and physical properties of a coating film.

Also a group represented by $R^3$, in which Y is H and X is $C_6H_{12}$ or $C_9H_{18}$; a group represented by $R^4$, in which Y is H, V is $CH_2CH_2$, m is 1 or 2, and Z is $CH_2CH_2$; and a group represented by $R^5$, in which Y is H, W is $C_3H_6$, Z is $CH_2CH_2$ and p is 1 or 2 are preferable from the viewpoint of a good balance between reactivity and physical properties of a coating film and from the point of relaxing a shrinking stress between the high molecular weight compound obtained by dehydrating or transesterification and the high molecular weight compound obtained by radical polymerization reaction.

It is preferable that in the compound (A), the number of $R^3$, $R^4$ or $R^5$ in one molecule is from 1 to 5, more preferably 1 or 2 from the point that a shrinking stress of a coating film which is caused by radical polymerization can be relaxed and adhesion to a substrate can be maintained.

The compound (A) may be synthesized by heating, for example, alkoxymethylolbenzoguanamine, in which in the formula (I), $R^2$ is an octyl group, and hydroxyl-containing radically polymerizable compound in the presence of an initiator.

Examples of the preferred hydroxyl-containing radically polymerizable compound are one or two or more of compounds represented by the formula (1a):

$$HO-X-OCO-CY=CH_2 \quad (1a)$$

in which Y is H or —$CH_3$; X is an alkylene group having 5 to 18 carbon atoms and a part or a whole of its hydrogen atoms may be substituted by halogen atom, the formula (2a):

$$HO-(V-O)_m-Z-OCO-CY=CH_2 \quad (2a)$$

in which Y is as defined above; each of V and Z is a linear or cyclic alkylene group having 2 to 8 carbon atoms and a part or a whole of its hydrogen atoms may be substituted by halogen atom, m is an integer of 1 to 20, and the formula (3a):

$$HO-(W-COO)_p-Z-OCO-CY=CH_2 \quad (3a)$$

in which Y and Z are as defined above; W is a linear or cyclic alkylene group having 3 to 8 carbon atoms and a part or a whole of its hydrogen atoms may be substituted by halogen atom, p is an integer of 1 to 8.

Examples of the alcohol represented by the formula (1a) are, for instance, ω-hydroxypentyl (meth)acrylate, ω-hydroxyhexyl (meth)acrylate, ω-hydroxynonyl (meth)acrylate, ω-hydroxydodecyl (meth)acrylate, ω-hydroxystearyl (meth)acrylate, and the like. Particularly from the viewpoint of adhesion to a substrate, ω-hydroxyhexyl (meth)acrylate is preferred.

Examples of the alcohol represented by the formula (2a) are, for instance, diethylene glycol mono(meth)acrylate, triethylene glycol mono(meth)acrylate, tetraethylene glycol mono(meth)acrylate, dipropylene glycol mono(meth)acrylate, tetrapropylene glycol mono(meth)acrylate, and the like. From the viewpoint of being easily available, diethylene glycol mono(meth)acrylate is particularly preferred.

Examples of the alcohol represented by the formula (3a) are, for instance, γ-hydroxypropyloyloxyethyl (meth)acrylate, γ-hydroxypropyloyloxypropyl (meth)acrylate, γ-hydroxybutyloyloxyethyl (meth)acrylate, δ-hydroxybutyloyloxypropyl (meth)acrylate, and the like. From the viewpoint of being easily available, γ-hydroxypropyloyloxyethyl (meth)acrylate is particularly preferred.

In order to prepare the compound (A) in which $R^2$ is alkyl, cycloalkyl or phenyl, a methoxy compound having methyl as $R^2$ and a corresponding alcohol such as octanol are heated in the presence of an initiator.

Specifically preferred compounds (A) are the following two compounds.

(1) A benzoguanamine acrylate resin, in which in the formula (I), Y in $R^3$, $R^4$ or $R^5$ is H.

This resin has features that the number of crosslinking points of the condensation-polymerizable functional group is small and crosslinking of the radically polymerizable functional group is rapidly achieved. The resin is useful particularly in case where a baking temperature is low or a baking period of time is short. Also the resin is excellent from the point that a coating film having ductility can be obtained.

Examples of the resin are, for instance, trioctylmethylolmonoacryloyloxyethylmethylolbenzoguanamine, dioctylmethyloldiacryloyloxyethylmethylolbenzoguanamine, and the like.

(2) A benzoguanamine methacrylate resin, in which in the formula (I), Y in $R^3$, $R^4$ or $R^5$ is —$CH_3$.

This resin has features that the number of crosslinking points of the condensation-polymerizable functional group is small and crosslinking of the radically polymerizable functional group is slowly achieved. The resin is useful particularly in case where a baking temperature is high or a baking period of time is long. Also the resin is excellent from the point that a coating film having ductility equal to that of the resin (1) and a higher hardness can be obtained.

Examples of the resin are, for instance, trioctylmethylolmonomethacryloyloxyethyl methylolbenzoguanamine, dioctylmethyloldimethacryloyloxyethylmethylolbenzoguanamine, and the like.

In the coating composition for baking finish of the present invention, by further adding the radically polymerizable (meth)acrylate compound (B), a polymer is prepared from such a monomer in a coating film, and at the same time, the monomer is polymerized with the radically polymerizable double bond contained in the compound (A) to make the weight of the polymer higher or advance a three-dimensional polymerization network formation, which further enhances water resistance, solvent resistance, retort resistance, abrasion resistance and scratch resistance.

The radically polymerizable (meth)acrylate compound (B) used in the present invention is (1) an alkyleneoxide-modified (meth)acrylate prepared by reacting (meth)acrylic acid with an alcohol having ethyleneoxide or propyleneoxide adduct, a carboxyester-modified (meth)acrylate prepared by reacting a carboxyalkyl (meth)acrylate with an alcohol, an epoxy-modified (meth)acrylate prepared by reacting acrylic acid or methacrylic acid with epoxy group of glycidyl ether of an alcohol, a (meth)acrylate having urethane bond and prepared by reacting a (meth)acrylate having hydroxyl with a compound having isocyanate group at its end or a mixture thereof; or (2) a (meth)acrylate-modified epoxy resin prepared by reacting (meth)acrylic acid with an epoxy resin, a (meth)acrylate-modified epoxy resin prepared by reacting (meth)acrylic acid with the epoxy resin modified by the above-mentioned alkyleneoxide or carboxylalkyl, a (meth)acrylate prepolymer or polymer having urethane bond and prepared by reacting a (meth)acrylate having hydroxyl with a compound having isocyanate group at its end, a (meth)acrylate-modified polyester prepared by reacting (meth)acrylic acid to a polyester or a mixture thereof.

Each compound is explained below.

(a) Alkyleneoxide-modified (meth)acrylate prepared by reacting (meth)acrylic acid with an alcohol having ethyleneoxide or propyleneoxide adduct Specifically there are ethyleneoxide-modified (meth)acrylate and propyleneoxide-modified (meth)acrylate prepared by reacting one or two or more of acrylic acids or methacrylic acids with the following alcohol having ethyleneoxide or propyleneoxide adduct. The number of moles of added ethyleneoxides or propyleneoxides is usually from 1 to 10 moles, preferably from 1 to 6 moles based on 1 mole of (meth)acrylate.

Examples of the above-mentioned alcohol are, for instance, saturated or unsaturated glycols such as ethylene glycol, diethylene glycol, triethylene glycol, tetraethylene glycol, polyethylene glycol, 1,2-propylene glycol, 1,3-propylene glycol, dipropylene glycol, tripropylene glycol, tetrapropylene glycol, polypropylene glycol, 1,2-butanediol, 1,3-butanediol, 1,4-butanediol, 1,4-butenediol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, 1,4-cyclohexanediol, 1,4-cyclohexanedimethanol, 1,9-nonanediol and neopentyl glycol; triols such as glycerine, trimethylolethane, trimethylolpropane, 1,2,6-cyclohexanetriol and 1,3,5-triethanolisocyanurate; polyols such as pentaerythritol, ditrimethylolpropane and dipentaerythritol; polyester polyols obtained by ring-opening and polymerizing cyclic ester; polybutadiene glycols; and polyols having phenolic hydroxyl such as bisphenol A and bisphenol F.

It is not necessary to react acrylic acid or methacrylic acid with all hydroxyl groups or glycidyl groups in one molecule of the above-mentioned alcohols or adducts, and there may remain some of hydroxyl groups without reacting acrylic acid or methacrylic acid. This matter applies to the following compounds having epoxy or glycidyl.

Examples are, for instance, tri[2-(meth)acryloyloxyethoxy]trimethylolpropane, monoacryloyldi[2-(meth)acryloyloxyethoxy]trimethylolpropane, tetra[2-(meth)acryloyloxyethoxy]pentaerythritol, di(meth)acryloyldi[2-(meth)acryloyloxyethoxy]pentaerythritol, penta[2-(meth)acryloyloxyethoxy]dipentaerythritol, 1,3,5-tri[2-(meth)acryloyloxydiethoxy]isocyanurate, monoacryloyldi[2-(meth)acryloyl-2-methyloxyethoxy] trimethylolpropane, tetra[2-(meth)acryloyl-2-methyloxyethoxy]pentaerythritol, triacryloyltri[2-(meth) acryloyl-2-methyloxyethoxy]dipentaerythritol, penta[2-(meth)acryloyl-2-methyloxyethoxy]dipentaerythritol, di[2-(meth)acryloyloxydiethoxy] bisphenol A, and the like.

(b) Carboxyalkylester-modified (meth)acrylate prepared by reacting a carboxyalkyl (meth)acrylate with an alcohol Specifically there are carboxyalkylester-modified (meth)acrylates prepared by reacting a carboxyalkyl (meth)acrylate such as β-carboxyethyl (meth)acrylate or ε-carboxypropyl (meth)acrylate with the above-mentioned alcohol. The number of moles of reacted carboxyalkylesters is usually from 1 to 10 moles, preferably from 1 to 6 moles based on 1 mole of (meth)acrylate.

Examples are 1,4-butanediolbis[β-carboxyethyl(meth) acrylate], 1,6-hexanediolbis[β-carboxyethyl(meth)acrylate], neopentylglycolbis[β-carboxyethyl(meth)acrylate], diethyleneglycolbis[β-carboxyethyl(meth)acrylate], trimethylolpropanebis[β-carboxyethyl(meth)acrylate], trimethylolpropanetris[β-carboxyethyl(meth)acrylate], pentaerythritolbis[β-carboxyethyl(meth)acrylate], pentaerythritoltris[β-carboxyethyl(meth)acrylate], pentaerythritoltetrakis[β-carboxyethyl(meth)acrylate], dipentaerythritoltetrakis[β-carboxyethyl(meth)acrylate], 1,4-butanediolbis[ε-carboxypropyl(meth) acrylate], 1,6-hexanediolbis[ε-carboxypropyl(meth)acrylate], neopentylglycolbis[ε-carboxypropyl(meth)acrylate], diethyleneglycolbis[ε-carboxypropyl(meth)acrylate], trimethylolpropanebis[ε-carboxypropyl(meth)acrylate], trimethylolpropanetris[ε-carboxypropyl(meth)acrylate], pentaerythritolbis[ε-carboxypropyl(meth)acrylate], pentaerythritoltris[ε-carboxypropyl(meth)acrylate], pentaerythritoltetrakis[ε-carboxypropyl(meth)acrylate], dipentaerythritoltetrakis[ε-carboxypropyl(meth)acrylate], and the like.

(c) Epoxy-modified (meth)acrylate prepared by reacting acrylic acid or methacrylic acid with an epoxy group of glycidyl ether of an alcohol Examples of the epoxy-modified (meth)acrylate are, for instance, reaction products of (meth)acrylic acid with glycidyl ethers such as ethylene glycol diglycidyl ether, diethylene glycol diglycidyl ether, triethylene glycol diglycidyl ether, polyethylene glycol diglycidyl ether, propylene glycol diglycidyl ether, dipropylene glycol diglycidyl ether, tripropylene glycol diglycidyl ether, polypropylene glycol diglycidyl ether, 1,6-hexanediol diglycidyl ether, neopentyl glycol diglycidyl ether, trimethylolpropane tridiglycidyl ether, pentaerythritol tetradiglycidyl ether, bisphenol A diglycidyl ether, and the like.

(d) (Meth)acrylate having urethane bond and prepared by reacting a (meth)acrylate having hydroxyl with a compound having isocyanate group at its end Specifically there are reaction products of a secondary alcohol prepared by reacting acrylic acid or methacrylic acid and a resin such as polyester or polyether resin having isocyanate group at its end.

For example, there are phenyl glycidyl ether acrylate hexamethylene diisocyanate urethane pre-polymer, glycerine dimethacrylate hexamethylene diisocyanate urethane pre-polymer, pentaerythritol trimethacrylate hexamethylene diisocyanate urethane pre-polymer, and the like.

(e) (Meth)acrylate-modified epoxy resin prepared by reacting (meth)acrylic acid to an epoxy resin The (meth)acrylate-modified epoxy resin is prepared by reacting (meth)acrylic acid with a glycidyl group of an epoxy resin such as Epon 828, 1001 and 1004 (available from Shell Chemical Co., Ltd.).

Examples thereof are epoxy acrylate resins such as KAYARAD R-130, R-190 and R-9235 (available from Nippon Kayaku Kabushiki Kaisha) and EB3600, EB3605, EB3700 and EB3703 (available from DAICEL.UCB COMPANY LTD.).

(f (Meth)acrylate-modified epoxy resin prepared by reacting (meth)acrylic acid with an epoxy resin modified by the above-mentioned alkyleneoxide or carboxylalkyl Specifically the (meth)acrylate-modified epoxy resin is prepared by reacting (meth)acrylic acid with an epoxy resin having hydroxyl which is obtained by reacting ethyleneoxide or propyleneoxide with an epoxy resin such as EPON 828, 1001 and 1004 (available from Shell Chemical Co., Ltd.).

(g) (Meth)acrylate prepolymer or polymer having urethane bond and prepared by reacting a (meth)acrylate having hydroxyl with a compound having isocyanate group at its end Specifically the (meth)acrylate prepolymer or polymer having urethane bond is prepared by reacting a monomer, prepolymer or polymer having isocyanate group such as tolylene diisocyanate and moisture curing urethane oligomer with an acrylic monomer having hydroxyl such as 2-hydroxy acrylate.

Specifically there are polyester acrylates having urethane bond such as EB210, EB220, EB4827, EB230, EB2000, EB5129 and B8402 (available from DAICEL.UCB COMPANY LTD.)

(h) (Meth)acrylate-modified polyester prepared by reacting (meth)acrylic acid with a polyester The (meth)acrylate-modified polyester is prepared by reacting (meth)acrylic acid with a polyester prepolymer or polymer which is obtained from polyol such as ethylene glycol or 1,6-hexanediol and polybasic acid such as phthalic acid or adipic acid.

Specifically there are polyester acrylates such as EB80, EB83, EB800, EB1870 and EB2870 (available from DAICEL.UCB COMPANY LTD.)

It is possible to add two or more compounds mentioned above.

The radically polymerizable (meth)acrylate compound (B) is preferably in the form of liquid at normal temperature, and may be a dimer, oligomer or prepolymer as far as it has a radically polymerizable group.

Those radically polymerizable (meth)acrylate compounds (B) are polymerized by heat at the time of baking. During the thermal polymerization process, since polymerization reaction competes with evaporation, from the viewpoint of acceleration of the polymerization reaction, preferable are compounds having two or more radically polymerizable groups in one molecule, more preferably 3 to 5 radically polymerizable groups in one molecule. Also preferable are compounds having a molecular weight of not less than 200 and containing a functional group of high polarity, for example ionic functional group such as hydroxyl, carboxyl and amino, ether bond, ester bond or amide bond for increasing evaporation heat from the viewpoint of inhibiting evaporation. From the viewpoint of coatability (adjustment of viscosity), it is preferable that the molecular weight is adjusted to not more than 2000.

As mentioned above, the radically polymerizable compounds (B) are polymerized with each other, and besides are radically polymerized with radically polymerizable double bonds in the compound (A) to make higher three dimensional network structure. As a result, water resistance, solvent resistance, retort resistance, abrasion resistance and scratch resistance of the coating film are enhanced more.

Particularly when ethylene oxide-modified, propylene oxide-modified or carboxyalkyl ester-modified (meth) acrylate compound is used, an increase in molecular weight is further accelerated, and as a result, water resistance, solvent resistance, retort resistance, abrasion resistance and scratch resistance of the cured coating film are enhanced remarkably. An amount of modification by ethyleneoxide, propyleneoxide or carboxyalkyl ester is from 1 to 10 moles, preferably from 1 to 6 moles based on 1 mole of the (meth)acrylic acid.

The coating composition of the present invention contains an initiator for condensation reaction of the compound (A). The initiator may be one which is usually used and causes condensation of a condensation-polymerizable functional group of the compound (A), i.e., $-CH_2-OR^2$ by dehydrating, dealcoholation or transesterification.

Examples of the initiator are aromatic sulfonic acids such as sulfonic acid and paratoluenesulfonic acid; carbonic acids such as acetic acid, linoleic acid and linolenic acid; phosphoric acids such as phosphoric acid and dimethoxy phosphate; aromatic iodonium salt generating Lewis acid by thermal decomposition; aromatic sulfonium salt; aromatic selenium salt; aromatic diazonium salt; and the like.

Examples of the aromatic iodonium salt are diaryliodonium salts, for instance, diphenyliodonium hexafluoroantimonate, diphenyliodonium hexafluorophosphate, 4-chlorophenyliodonium tetrafluoroborate, di(4-methoxyphenyl)iodonium chloride, (4-methoxyphenyl)phenyliodonium chloride and the like.

Examples of the aromatic sulfonium salt are, for instance, triarylsulfonium salts such as triphenylsulfonium tetrafluoroborate, triphenylsulfonium hexafluorophosphate, p-(phenylthio)phenyldiphenylsulfonium hexafluoroantimonate, triphenylsulfonium hexafluoroantimonate and 4-chlorophenyldiphenylsulfonium hexafluorophosphate; diphenylsulfonium hexafluoroantimonate; dialkyiphenylsulfonium hexafluoroantimonate; dialkylphenylsulfonium hexafluorophosphate; 4,4-bis[di(β-hydroxyethoxy)phenylsulfonio]phenylsulfide-bis-hexafluoroantimonate; 4,4-bis[di(β-hydroxyethoxy) phenylsulfonio]phenylsulfide-bis-hexafluorophosphate; and the like.

Examples of the aromatic selenium salt are, for instance, triarylselenium salts such as triphenylselenium hexafluorophosphate and triphenylselenium hexafluoroantimonate.

Examples of the aromatic diazonium salt are, for instance, phenyldiazonium hexafluoroantimonate, phenyldiazonium hexafluorophosphate and phenyldiazonium. hexafluorotetrafluoroborate.

In addition, there are sulfonium salt type thermal polymerization initiators such as CP-66 and CP-77 which are products of ASAHI DENKA Kogyo K.K., (2,4-cyclopentadiene-1-il)[(1-methoxyethyl)benzene]-iron-hexafluorophosphate and the like.

The above-mentioned initiator for condensation may be used in an amount of 1/1000 to 1/100 equivalent to one equivalent of condensation-polymerizable functional group of the compound (A).

The radical polymerization is carried out by heat at the time of baking. For catalyzing the radical polymerization, a radical polymerization initiator may be used.

Examples of the preferred radical polymerization initiator are, for instance, benzoins such as benzoin, benzoin methyl ether, benzoin ethyl ether and benzoin isopropyl ether and alkyl ethers thereof; acetophenones such as acetophenone, 2,2-dimethoxy-2-phenylacetophenone, 2,2-diethoxy-2-phenylacetophenone, 1,1-dichloroacetophenone, 1-hydroxycyclohexylphenylketone, 2-hydroxycyclohexylphenylketone and 2-methyl-1-[4-(methylthio)phenyl]-2-morpholino-propane-1-on; anthraquinones such as 2-methylanthraquinone and 2-aminoanthraquinone; thioxanthones such as 2,4-dimethylthioxanthone, 2,4-diethylthioxanthone, 2-chlorothioxanthone and 2,4-diisopropylthioxanthone; ketals such as acetophenone dimethyl ketal and benzyl dimethyl ketal; benzophenones such as benzophenone and [4-(methylphenylthio)phenyl]phenylmethanone; xanthones such as xanthone and 2,4-dimethylxanthone; organic peroxides such as benzoyl peroxide, dichlorobenzoyl peroxide, dicumyl peroxide, di-t-butyl peroxide, lauroyl peroxide and 2,5-dimethyl-2,5-di(t-butylperoxy)hexyne-3,2,5-dimethyl-2,5-di(t-butylperoxy)hexane; organic peroxyesters such as t-butyl peracetate, t-butyl perbenzoate, t-butyl perphenylacetate, t-butyl perisobutylate, t-butylper-sec-octoate, t-butyl perpivalate, cumyl pivalate and t-butyl per-diethylacetate; and the like. Among them, from the viewpoint that radicals are easily generated by thermal decomposition, benzoins such as benzoin and organic peroxides such as benzoin peroxide are preferred.

Also known benzoic acid type or tertiary amine type polymerization accelerator may be used in combination with the polymerization initiator.

The radical polymerization initiator can be added in an amount of 1/10000 to 1/100 equivalent, preferably 1/500 to 1/100 equivalent to one equivalent of radically polymerizable double bond of the radically polymerizable (meth) acrylate compound (B).

The radically polymerizable (meth)acrylate compound (B) is added in an amount of 1 to 95% by weight in the coating composition, and a preferred amount is 10 to 80% by weight from the viewpoint of adjustment of a viscosity of the coating composition. The compound (A) is added in an amount of 99 to 5% by weight, preferably 90 to 20% by weight in the coating composition. When the compound (A) is less than 5% by weight, there is a case where crosslinking is insufficient.

The compound (A) is in the form of liquid and can be coated in the form of a solvent-less coating composition without using a solvent. The compound (A) can be formed into a solvent coating composition having a high solid content and prepared by using a solvent in an amount of not more than 20% by weight, preferably not more than 10% by weight.

Examples of usable solvent are, for instance, ketones such as acetone, methyl ethyl ketone and methyl isobutyl ketone; esters such as ethyl acetate, propyl acetate and butyl acetate; ethers such as tetrahydrofurane, dioxane, butyl phenyl ether and anisole; aromatic hydrocarbons such as toluene, xylene, butylbenzene, pentylbenzene and dodecylbenzene; hydrocarbons such as n-hexane, cyclohexane, petroleum naphtha, solvent naphtha and ligroin; alcohols having 1 to 20 carbon atoms such as methanol, ethanol, isopropyl alcohol, n-propyl alcohol, 2-ethylhexyl alcohol, cyclohexanol and decanol; derivatives of polyol such as ethylene glycol monomethyl ether and ethylene glycol monoethyl ether; amides such as dimethylformamide; sulfoxides such as dimethyl sulfoxide; and the like. Those solvents can be used solely or in a mixture of two or more thereof. If too much solvent is added, an amount of misting increases and heat energy required at the time of baking increases.

Also a reactive additive may be used instead of the solvent or in combination use with the solvent. The reactive additive is a compound which is incorporated in a network formed by curing of the compound (A) and contributes to form a three-dimensional network structure. From this point of view, the reactive additive differs from the solvent which does not contributes to the reaction.

Examples of the reactive additive are various known polyols usually used for producing polyurethane, for instance, saturated or unsaturated glycols such as ethylene glycol, diethylene glycol, triethylene glycol, tetraethylene glycol, polyethylene glycol, 1,2-propylene glycol, 1,3-propylene glycol, dipropylene glycol, tripropylene glycol, tetrapropylene glycol, polypropylene glycol, 1,2-butanediol, 1,3-butanediol, 1,4-butanediol, 1,4-butenediol, 1,4-butynediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, 1,4-cyclohexanediol, 1,4-cyclohexanedimethanol, 1,9-nonanediol and neopentyl glycol; triols such as glycerine, trimethylolethane, trimethylolpropane and 1,2,6-cyclohexanetriol; polyols such as pentaerythritol, ditrimethylolpropane and dipentaerythritol; polyols having phenolic hydroxyl such as bisphenol A and bisphenol F; polyols obtained by adding one or two or more ethylene oxides or propylene oxides to the above-mentioned alcohols; polyols obtained by adding one or two or more carboxyalkyl esters to the above-mentioned alcohols; and the like. Those reactive additives may be used in combination of two or more thereof.

Besides alcohols, epoxy group-containing glycidyl ethers of the above-mentioned alcohols can be used as the reactive additive. Also high molecular weight substances, for example, polyester polyols having hydroxyl and obtained by ring-opening polymerization of cyclic esters, polybutadiene glycols, acrylic polyols obtained by copolymerizing 2-hydroxy (meth)acrylate with other vinyl monomer and the like can be used as the reactive additive.

For the coating composition of the present invention, a thermal condensation-polymerizable crosslinking resin such as an amino resin or epoxy resin can be used together as the reactive additive.

Examples of the amino resin are alkyl type, methylol type or imino type melamine resins, benzoguanamine resin, glycoluril resin, urea resin and the like. Among them, examples of a methylated, ethylated, butylated or isobutylated complete alkyl type amino resin are melamine resins such as Cymel 303, Cymel 266 and Cymel 238; benzoguanamine resins such as Cymel 1123; glycoluril resins such as Cymel 1170 and Cymel 1174; and urea resins such as UFR65. Examples of a methylol-mixed alkyl type and methylol type amino resin are melamine resins such as Cymel 370 and Cymel 272; glycoluril resins such as Cymel 1173; and urea resins such as UFR300. Examples of an amino-mixed alkyl type and imino type amino resin are melamine resins such as Cymel 325 and Cymel 703; and benzoguanamine resins such as Cymel 1128. All the above-mentioned amino resins are available from MITSUI SYTEC LTD.

Examples of the methylol/imino type amino resin are melamine resins such as Cymel 701 and Cymel 202. Further there is a melamine resin or benzoguanamine resin of the compound (A), in which $R^3$ is not contained in $R^2$ and n is 0 or an integer of 1 to 4.

Also usual epoxy resins such as Epon 828, 1001, 1004 and 1009 (available from Shell Chemical Co., Ltd.) can be used.

An amount of the reactive additive to be added is not more than 50% by weight based on the whole composition. The reactive additive can replace a part of the solvent to be used in combination with the solvent.

The coating composition of the present invention is prepared by mixing the compound (A), the compound (B), a condensation initiator and/or a radical polymerization initiator and further, as the case demands, by adding a solvent, reactive additive and other various additives.

The radically polymerizable (meth)acrylate compound (B) may be added as it is when it is in the form of liquid, and then stirred and mixed. When the compound is in the form of solid at room temperature, it may be once melted by increasing its temperature and then added, stirred and mixed or may be kneaded by adding a small amount of solvent.

To the coating composition of the present invention can be added various additives which are usually added to various paints in an amount not impairing effects of the present invention. Examples of the additive are, for instance, pigment, wax, filler, defoaming agent, leveling agent, flatting agent, foaming agent, pigment dispersant, surface treating agent, antistatic agent, inhibitor and the like. It is preferable that the solid contents such as pigment and filler are surface-treated by usual method in order to enhance weather resistance, etc. of a coating film.

Examples of the pigment are white pigments such as zinc oxide, titanium oxide, antimony white and zinc sulfide; yellow pigments such as chrome yellow, zinc yellow, cadmium yellow, iron oxide yellow, mineral fast yellow, nickel titanium yellow, naples yellow, Naphthol Yellow S, Hansa Yellow G, Hansa Yellow 10G, Benzidine Yellow G, Benzidine Yellow GR, Quinoline Yellow Lake, Permanent Yellow NCG and Tartrazine Lake; orange pigments such as chrome orange, molybdenum orange, Permanent Orange GTR, Pyrazolone Orange, Vulcan Orange, Indanthrene Brilliant Orange RK, Benzidine Orange G and Indanthrene Brilliant Orange GK; red pigments such as iron oxide red, cadmium red, red lead, cadmium mercury sulfide, Permanent Red 4R, Lithol Red, Pyrazolone Red, Watchung Red calcium salt, Lake Red D, Brilliant Carmine 6B, eosine lake, Rhodamine Lake B, Alizarin Lake and Brilliant Ccarmine 3B; purple pigments such as manganese purple, Fast Violet B and Methyl Violet Lake; blue pigments such as iron blue, cobalt blue, Alkali Blue Lake, Victoria Blue lake, Phthalocyanine Blue, non-metallic Phthalocyanine Blue, partly chlorinated Phthalocyanine Blue, Fast Sky Blue and Indanthrene Blue BC; green pigments such as chrome green, chromium oxide, Pigment Green B, Malachite Green Lake and final yellow green G; black pigments such as carbon black, acetylene black, lamp black and aniline black; extender pigments such as baryta powder, barium carbonate, clay, silica, white carbon, talc, alumina white and Penton; and the like.

When an aluminum pigment prepared by heating an aluminum film in high degree of vacuum and then finely pulverizing is used, a coating film having good feeling of silver (metallic feeling) can be obtained.

Examples of the filler are those raised above as the extender pigment.

Examples of the defoaming agent are known ones, for instance, silicone oil.

Examples of the leveling agent are known ones, for instance, fluorine-containing surfactant, silicone type surfactant and acrylic copolymer.

Examples of the wax are known ones, for instance, silicone oil, fluorine-containing oil, palm oil, lanolin oil, polyethylene powder and fluorine-containing resin powder.

Substrates to be coated are, for example, metals such as galvanized steel sheet, chromate-treated steel sheet, aluminum, vinyl chloride-coated steel sheet, polypropylene-coated steel sheet and polyethylene terephthalate-laminated steel sheet, glass, concrete and the like. The substrates are not limited to them. From the viewpoint of adhesion particularly to the surface of metal, the coating composition of the present invention is suitable for coating on a metal surface of galvanized steel sheet, chromate-treated steel sheet, aluminum and polyethylene terephthalate-laminated steel sheet.

Examples of coating method are, for instance, roll coating, brush coating, spray coating and flow coating.

Example of the roll coating procedure is to coat by roll coater and then carry out baking.

Baking conditions are usually a baking temperature of 150° to 300° C. and a baking time of 5 seconds to 15 minutes. Preferred baking conditions for cans are usually a baking temperature of 180° to 300° C. and a baking time of 5 to 180 seconds. By baking under the above-mentioned conditions, the compound (A) is condensation-polymerized and the molecular weight thereof becomes high and thus a cured coating film is formed. In that case, it seems that the radically polymerizable double bond contained in the compound (A) is also subjected to radical polymerization thermally and a coating film more excellent in solvent resistance and water resistance is formed. Also it seems that the radically polymerizable (meth)acrylate compound (B) is polymerized solely and at the same time, copolymerized with the compound (A) to form a network in which the both resins are entangled with each other.

The composition of the present invention is useful not only as a coating composition but also as a printing composition as mentioned above.

The printing composition is the same as the coating composition except that it is in the form suitable for application for printing. For application of the printing composition, methods usually employed for printing for baking finish, such as off-set printing, gravure printing, flexographic printing and screen printing can be adopted. For example, in case of off-set printing, the printing composition of the present invention, after transferred to a blanket with a resin letterpress, may be printed on an outer surface of a can and bake-finished under the above-mentioned conditions.

The present invention is then explained by means of examples, but is not limited to the examples.

EXAMPLE 1

A solvent-less coating composition of the present invention was prepared by sufficiently mixing the following components in amounts mentioned below with stirring.

| Components | Amount (part by weight) |
| --- | --- |
| Hexylated benzoguanamine acrylate | 25 |
| Tetra(2-acryloyloxyethoxy) pentaerythritol | 15 |
| Tri(2-acryloyloxyethoxy) trimethylolpropane | 25 |
| 1,6-Hexanediol diacrylate | 25 |
| Propylene glycol monoacrylate | 6 |
| SUPERLANOLINE | 1 |
| BYK 300 | 1 |
| NACURE 4167 | 1 |
| IRGACURE 184 | 1 |

The hexylated benzoguanamine acrylate used was a compound having an average molecular weight of 1,300 and represented by the formula (I), in which $R^1$ was phenyl, $R^2$ was a hexyl group or $R^5$ (W was $C_3H_6$, Z was $CH_2CH_2$ and Y was H), p was 1 and one $R^5$ was contained in one molecule. SUPERLANOLINE is a wax available from CRODA JAPAN K.K., and BYK 300 is a silicone type leveling agent available from BYK-Chemie JAPAN, LTD. NACURE 4167 is an acidic initiator available from Kusumoto Kasei Kabushiki Kaisha, and IRGACURE 184 is a radical initiator available from Ciba Specialty Chemicals Inc.

The obtained coating composition contained 100% solids in the coating film, and its viscosity was 135 seconds (Ford viscosity cup No. 4, at 25° C.). Misting of the coating composition was measured by the method mentioned below. The results are shown in Table 1.

(Measurement of misting)

A roll coater which is shown in FIG. 1 and available from Shinsei Steel Co., Ltd. was used. A rubber roller 1 having a diameter of 70 mm was contacted to a metal roller 2 having a diameter of 70 mm, and those two rollers 1 and 2 were rotated at 1000 rpm with the metal roller 2 being dipped in the coating composition 3 contained in a reservoir vessel 4. A misting measuring plate 5 (10 mm×10 mm) was stood vertically at a distance 50 mm apart in a horizontal direction from a contact point a of the rollers 1 and 2. An amount of the coating composition which was scattered and deposited on the surface of the plate 5 was measured. Criteria for evaluation are as follows.

○: Almost no scattering was found.

Δ: Mist-like scattering was found.

X: In addition to the mist-like scattering, there were large size scatterings

Then the coating composition was applied to an aluminum DI can (draw and ironing can) by roll coating in an amount of 40±5 mg/100 cm², and bake-finished at 200° C. for 100 seconds in an electric oven.

Physical properties mentioned below of the cured coating film were measured. The results are shown in Table 1.

Pencil hardness: Measured according to JIS K 5400.

Adhesion: Measured according to cross-cut adhesion test method of JIS K 5400.

Impact resistance: Measured according to JIS K 5400 by using a Dupont type impact resistance tester (available from Toyo Seiki Kabushiki Kaisha) under the conditions of a weight of 500 g, a punching diameter of ½inch and a weight dropping height of 30 cm. Criteria for evaluation were as follows.

○: Neither cracking nor peeling was found at all on the coating film.
Δ: Cracking was found on the surface of the coating film, but no peeling was found.
X: Cracking and peeling were found on the coating film.

Solvent resistance: The surface of a coating film was wiped forward and backward 50 times with a JIS No. 3 cotton cloth reinforced with metal wire and impregnated with methyl ethyl ketone, and the condition of the surface of the coating film was observed with naked eyes. Criteria for evaluation were as follows.
○: No change due to melting was found on a coating film.
Δ: A change due to melting was found on the surface of the coating film.
X: The coating film was melted and a surface of a substrate can be seen.

Sliding property: Measured by three-point support method with a kinematic friction tester (Model TR friction tester available from Toyo Seiki Kabushiki Kaisha).
○: Coefficient of dynamic friction was small and sliding property was good.
Δ: Coefficient of dynamic friction was slightly large and sliding property was inferior.
X: Coefficient of dynamic friction was large and sliding property was not good.

Pencil hardness in hot water of 80° C.: A cured coating film was dipped in hot water of 80° C. for 30 minutes and pencil hardness was measured by the method mentioned above (The results are used as criteria for evaluation of water resistance).

Physical properties after treating in retort: A cured coating film was allowed to stand in steam of 130° C. for 30 minutes (treating in retort), and then retort resistance and the above-mentioned physical properties were determined (The results are used as criteria for evaluation of water resistance).

Retort resistance: Resistance against treatment in retort was judged from the overall aspect of appearance and physical properties of a coating film after treating in retort. Criteria for evaluation were as follows.
○: With respect to all samples, neither whitening nor orange peel was found on the surface of a coating film.
Δ: With respect to half or less samples, whitening and orange peel were found on the surface of a coating film.
X: With respect to half or more samples, whitening and orange peel were found on the surface of a coating film.

Abrasion resistance: A test piece having a cured coating film was fixed to a stand of model HEIDON-22 surface abrasion tester (available from Toyo Seiki Kabushiki Kaisha), and a test was carried out at a load of 20 g/cm$^2$ by rubbing a steel wool (No. 0000) forward and backward ten times.
○: No flaw was found on the surface of a coating film.
Δ: Flaw was found slightly on the surface of a coating film.
X: Flaw reaching inside a coating film was found.

Scratch resistance: A test piece having a cured coating film was fixed to a stand of model HEIDON-22 surface property tester (available from Toyo Seiki Kabushiki Kaisha), and a diamond needle (diameter of needle end: 125 μm) was moved forward and backward on the surface of the film one time at a load of 100 g.
○: No flaw was found on the surface of a coating film, or there was a flaw slightly only on the surface of the film.
Δ: Flaw was found slightly on the surface of a coating film, and was partly reaching inside the film.
X: Flaw was reaching inside a coating film.

EXAMPLE 2

A solvent-less coating composition was prepared in the same manner as in Example 1 except that a hexylated benzoguanamine methacrylate (In the formula (I), $R^1$ is phenyl, $R^2$ is a hexyl group and $R^5$ (W is $C_3H_6$, Z is $CH_2CH_2$ and Y is —$CH_3$), m is 1, one $R^5$ is contained in one molecule, and an average molecular weight is 1,100) was used instead of the hexylated benzoguanamine acrylate. Physical properties of the composition and results of misting are shown in Table 1.

The obtained coating composition was applied and baked in the same manner as in Example 1, and physical properties of the cured coating film were determined in the same manner as in Example 1. The results are shown in Table 1.

EXAMPLE 3

A solvent-less coating composition was prepared in the same manner as in Example 1 except that an octylated benzoguanamine acrylate (In the formula (I), $R^1$ is phenyl, $R^2$ is octyl and $R^5$ (W is $CH_2CH_2$, Z is $CH_2CH_2$ and Y is —$CH_3$), p is 1, one $R^5$ is contained in one molecule, and a weight average molecular weight is 1,400) was used instead of the hexylated benzoguanamine acrylate. Physical properties of the composition and results of misting are shown in Table 1.

The obtained coating composition was applied and baked in the same manner as in Example 1, and physical properties of the cured coating film was determined in the same manner as in Example 1. The results are shown in Table 1.

EXAMPLE 4

A solvent-less coating composition was prepared in the same manner as in Example 3 except that an octylated benzoguanamine methacrylate (In the formula (I), $R^1$ is phenyl, $R^2$ is octyl and $R^5$ (W is $C_3H_6$, Z is $CH_2CH_2$ and Y is —$CH_3$), p is 1, one $R^5$ is contained in one molecule, and a weight average molecular weight is 1,450) was used instead of the octylated benzoguanamine acrylate. Physical properties of the composition and results of misting are shown in Table 1.

The obtained coating composition was applied and baked in the same manner as in Example 1, and physical properties of the cured coating film was determined in the same manner as in Example 1. The results are shown in Table 1.

EXAMPLE 5

A solvent-less coating composition of the present invention was prepared by mixing the following components in amounts mentioned below with dispersing by a roll mill.

| Components | Amount (part by weight) |
| --- | --- |
| Hexylated benzoguanamine acrylate (same as in Example 1) | 25 |
| Tetra(2-acryloyloxyethoxy)-pentaerythritol | 10 |
| Tri(2-acryloyloxyethoxy)-trimethylolpropane | 13 |
| 1,6-Hexanediol diacrylate | 13 |
| Propylene glycol monoacrylate | 4 |
| SUPERLANOLINE | 1 |
| NACURE 4167 | 1 |
| SOLSPERSE 20000 | 2 |
| IRGACURE 184 | 1 |
| Pigment (CR-58) | 30 |

The pigment (CR-58) is a titanium oxide pigment available from Ishihara Sangyo Kabushiki Kaisha, and SOLSPERSE 20000 is a pigment dispersing agent available from Zeneca Co., Ltd.

Physical properties of the obtained composition and results of misting are shown in Table 1.

The obtained coating composition was applied and baked in the same manner as in Example 1, and physical properties of the cured coating film was determined in the same manner as in Example 1. The results are shown in Table 1.

EXAMPLE 6

A solvent-less coating composition of the present invention was prepared by mixing the following components in amounts mentioned below with dispersing by a roll mill.

| Components | Amount (part by weight) |
| --- | --- |
| Hexylated benzoguanamine methacrylate (same as in Example 2) | 10 |
| Tetra(2-acryloyloxyethoxy)-pentaerythritol | 10 |
| Tri(2-acryloyloxyethoxy)-trirnethylolpropane | 13 |
| 1,6-Hexanediol diacrylate | 13 |
| Propylene glycol monoacrylate | 4 |
| SUPERLANOLINE | 1 |
| NACURE 4167 | 1 |
| SOLSPERSE 20000 | 2 |
| IRGACURE 184 | 1 |
| Pigment (CR-58) | 30 |

Physical properties of the obtained composition and results of misting are shown in Table 1.

The obtained coating composition was applied and baked in the same manner as in Example 1, and physical properties of the cured coating film was determined in the same manner as in Example 1. The results are shown in Table 1.

EXAMPLE 7

A solvent-less coating composition of the present invention was prepared by mixing the following components in amounts mentioned below with dispersing by a roll mill.

| Components | Amount (part by weight) |
| --- | --- |
| Octylated benzoguanamine acrylate (same as in Example 3) | 25 |
| Tetra(2-acryloyloxyethoxy)-pentaerythritol | 10 |
| Tri(2-acryloyloxyethoxy)-trimethylolpropane | 13 |
| 1,6-Hexanediol diacrylate | 13 |
| Propylene glycol monoacrylate | 4 |
| SUPERLANOLINE | 1 |
| NACURE 4167 | 1 |
| SOLSPERSE 20000 | 2 |
| IRGACURE 184 | 1 |
| Pigment (CR-58) | 30 |

Physical properties of the obtained composition and results of misting are shown in Table 1.

The obtained coating composition was applied and baked in the same manner as in Example 1, and physical properties of the cured coating film was determined in the same manner as in Example 1. The results are shown in Table 1.

EXAMPLE 8

A solvent-less coating composition of the present invention was prepared by mixing the following components in amounts mentioned below with dispersing by a roll mill.

| Components | Amount (part by weight) |
| --- | --- |
| Octylated benzoguanarnine methacrylate (same as in Example 4) | 25 |
| Tetra(2-acryloyloxyethoxy)-pentaerythritol | 10 |
| Tri(2-acryloyloxyethoxy)-trimethylolpropane | 13 |
| 1,6-Hexanecliol diacrylate | 13 |
| Propylene glycol monoacrylate | 4 |
| SUPERLANOLINE | 1 |
| NACURE 4167 | 1 |
| SOLSPERSE 20000 | 2 |
| IRGACURE 184 | 1 |
| Pigment (CR-58) | 30 |

Physical properties of the obtained composition and results of misting are shown in Table 1.

The obtained coating composition was applied and baked in the same manner as in Example 1, and physical properties of the cured coating film was determined in the same manner as in Example 1. The results are shown in Table 1.

EXAMPLE 9

A solvent-less coating composition of the present invention was prepared by stirring and mixing sufficiently the following components in amounts mentioned below.

| Components | Amount (part by weight) |
| --- | --- |
| Hexylated benzoguanamine acrylate (same as in Example 1) | 25 |
| Tetra(2-acryloyloxyethoxy)-pentaerythritol | 15 |
| Tri(2-acryloyloxyethoxy)-trimethylolpropane | 25 |
| 1,6-Hexanediol diacrylate | 25 |
| Propylene glycol monoacrylate | 6 |
| SUPERLANOLINE | 1 |
| BYK 300 | 1 |

-continued

| Components | Amount (part by weight) |
|---|---|
| NACURE 4167 | 1 |
| IRGACURE 184 | 1 |

Physical properties of the obtained composition and results of misting are shown in Table 1.

The obtained coating composition was applied and baked in the same manner as in Example 1, and physical properties of the cured coating film was determined in the same manner as in Example 1. The results are shown in Table 1.

EXAMPLE 10

A printing composition of the present invention was prepared by mixing the following components in amounts mentioned below with dispersing by a roll mill.

| Components | Amount (part by weight) |
|---|---|
| Octylated benzoguanamine acrylate | 25 |
| Tetra(2-acryloyloxyethoxy)-pentaerythritol | 10 |
| Tri(2-acryloyloxyethoxy)-trimethylolpropane | 5 |
| 1,6-Hexanediol diacrylate | 5 |
| NACURE 4167 | 1 |
| SOLSPERSE 20000 | 2 |
| IRGACURE 184 | 2 |
| Pigment (CR-58) | 50 |

Physical properties of the obtained printing composition and results of misting are shown in Table 1.

Letters were printed on the same aluminum can as in Example 1 by using the obtained printing composition by off-set printing method and then baked under the same conditions as in Example 1, and physical properties of the cured coating film was determined in the same manner as in Example 1. The results are shown in Table 1.

COMPARATIVE EXAMPLE 1

(Thermosetting organic solvent coating composition)

A thermosetting organic solvent coating composition was prepared by sufficiently stirring and mixing the following components in amounts mentioned below.

| Components | Amount (part by weight) |
|---|---|
| MALKEED 32 | 15 |
| Polyvinyl butyral | 7 |
| EPIKOTE 1004 | 15 |
| Xylol | 30 |
| Methyl isobutyl ketone | 5 |
| Butanol | 17 |
| Butyl cellosolve | 8 |
| SUPERLANOLINE | 1 |
| BYK 300 | 1 |
| NACURE 4167 | 1 |

MALKEED 32 is a maleic acid resin available from Arakawa Kogyo Kabushiki Kaisha, and EPIKOTE 1004 is an epoxy resin available from Yuka Shell Epoxy Co., Ltd.

Physical properties of the obtained coating composition (solid content: 38%) and results of misting are shown in Table 2.

The obtained coating composition was coated on an aluminum DI can in the same manner as in Example 1 so that a coating amount after baking would become 40 mg/100 cm$^2$, and the baking was carried out at 160° C. for ten minutes. Physical properties of the cured coating film was determined in the same manner as in Example 1. The results are shown in Table 2.

COMPARATIVE EXAMPLE 2

(Thermosetting aqueous coating composition)

A thermosetting aqueous coating composition was prepared by sufficiently stirring and mixing the following components in amounts mentioned below.

| Components | Amount (part by weight) |
|---|---|
| Varnish 1 | 70 |
| Water | 10 |
| Butyl cellosolve | 10 |
| Butanol | 7 |
| SUPERLANOLINE | 1 |
| BYK 300 | 1 |
| NACURE 4167 | 1 |

Varnish 1 was prepared by mixing 30 parts of styrene/acryl copolymer (JOHNCRYL 678 available from Nippon Johnson Co., Ltd., acid value 200), 5.9 parts of 28% aqueous ammonia, 1.1 parts of diethylaminoethanol and 63.3 parts of water and then heating and melting at 60° C. for four hours.

Physical properties of the obtained aqueous coating composition (solid content: 22%) and results of misting are shown in Table 2.

The obtained coating composition was applied on an aluminum DI can in the same manner as in Example 1 so that a coating amount after baking would become 40 mg/100 cm$^2$, and the baking was carried out at 160° C. for ten minutes. Physical properties of the cured coating film was determined in the same manner as in Example 1. The results are shown in Table 2.

COMPARATIVE EXAMPLE 3

(Ultraviolet radiation curing coating composition)

A ultraviolet radiation curing coating composition was prepared by sufficiently stirring and mixing the following components in amounts mentioned below.

| Components | Amount (part by weight) |
|---|---|
| UK-2201 | 25 |
| Pentaerythritol tetraacrylate | 15 |
| Trimethylolpropane triacrylate | 25 |
| 1,6-Hexanediol diacrylate | 25 |
| Propyleneglycol monoacrylate | 5 |
| IRGACURE 184 | 3 |
| SUPERLANOLINE | 1 |
| BYK 300 | 1 |

UK-2201 is a ultraviolet radiation curing urethane acrylate resin available from Nippon Kayaku Kabushiki Kaisha.

A viscosity of the obtained coating composition (solid content: 100%) was 90 seconds (Ford viscosity cup No. 4, at 25° C.), and an amount of misting was small (◯).

The obtained coating composition was applied in the same manner as in Example 1 and a coating film was cured by irradiating ultraviolet ray with a metal halide lamp having an output of 100 W/ cm. Physical properties of the cured coating film was determined in the same manner as in Example 1. The pencil hardness was F, adhesion was 0/100, impact strength was X, and solvent resistance was X.

After curing by ultraviolet radiation, the coating film was subjected to baking at 200° C. for 100 seconds in an electric oven. Physical properties of the cured coating film was determined in the same manner as in Example 1. The results are shown in Table 2.

TABLE 1

|  | Ex. 1 | Ex. 2 | Ex. 3 | Ex. 4 | Ex. 5 |
|---|---|---|---|---|---|
| Coating composition | | | | | |
| Solid content (%) | 100 | 100 | 100 | 100 | 100 |
| Viscosity (second) | 135 | 120 | 130 | 120 | 140 |
| Misting | ○ | ○ | ○ | ○ | ○ |
| Physical properties after baking finish | | | | | |
| Pencil hardness | 4H | 4H | 4H | 4H | 3H |
| Adhesion | 100/100 | 100/100 | 100/100 | 100/100 | 100/100 |
| Impact strength | ○ | ○ | ○ | ○ | ○ |
| Solvent resistance | ○ | ○ | ○ | ○ | ○ |
| Sliding property | ○ | ○ | ○ | ○ | ○ |
| Abrasion resistance | ○ | ○ | ○ | ○ | ○ |
| Scratch resistance | ○ | ○ | ○ | ○ | ○ |
| Pencil hardness in 80° C. hot water | F | F | F | F | 2B |
| Physical properties after treating in retort | | | | | |
| Pencil hardness | 3H | 3H | 3H | 3H | 2H |
| Adhesion | 100/100 | 100/100 | 100/100 | 100/100 | 100/100 |
| Impact strength | ○ | ○ | ○ | ○ | ○ |
| Solvent resistance | ○ | ○ | ○ | ○ | ○ |
| Sliding property | ○ | ○ | ○ | ○ | ○ |
| Abrasion resistance | ○ | ○ | ○ | ○ | ○ |
| Scratch resistance | ○ | ○ | ○ | ○ | ○ |
| Pencil hardness in 80° C. hot water | F | F | HB | HB | 3B |
| Retort resistance | ○ | ○ | ○ | ○ | ○ |

|  | Ex. 6 | Ex. 7 | Ex. 8 | Ex. 9 | Ex. 10 |
|---|---|---|---|---|---|
| Coating composition | | | | | |
| Solid content (%) | 100 | 100 | 100 | 100 | 100 |
| Viscosity (second) | 125 | 115 | 117 | 120 | 30 Pa.s* |
| Misting | ○ | ○ | ○ | ○ | ○ |
| Physical properties after baking finish | | | | | |
| Pencil hardness | 3H | 3H | 3H | 4H | 4H |
| Adhesion | 100/100 | 100/100 | 100/100 | 100/100 | 100/100 |
| Impact strength | ○ | ○ | ○ | ○ | ○ |
| Solvent resistance | ○ | ○ | ○ | ○ | ○ |
| Sliding property | ○ | ○ | ○ | ○ | ○ |
| Abrasion resistance | ○ | ○ | ○ | ○ | ○ |
| Scratch resistance | ○ | ○ | ○ | ○ | ○ |
| Pencil hardness in 80° C. hot water | 2B | 2B | B | F | HB |
| Physical properties after treating in retort | | | | | |
| Pencil hardness | 2H | 2H | 2H | 3H | 2H |
| Adhesion | 100/100 | 100/100 | 100/100 | 100/100 | 100/100 |
| Impact strength | ○ | ○ | ○ | ○ | ○ |
| Solvent resistance | ○ | ○ | ○ | ○ | ○ |
| Sliding property | ○ | ○ | ○ | ○ | ○ |
| Abrasion resistance | ○ | ○ | ○ | ○ | ○ |
| Scratch resistance | ○ | ○ | ○ | ○ | ○ |
| Pencil hardness in 80° C. hot water | 3B | 3B | 3B | B | B |
| Retort resistance | ○ | ○ | ○ | ○ | ○ |

*Measured at 30° C., at 100/sec with cone plate type viscometer.

TABLE 2

|  | Com. Ex. 1 | Com. Ex. 2 | Com. Ex. 3 |
|---|---|---|---|
| Coating composition | | | |
| Solid content (%) | 30 | 23 | 100 |
| Viscosity (second) | 80 | 90 | 90 |
| Misting | X | X | ○ |
| Physical properties after baking finish | | | |
| Pencil hardness | 3H | 3H | 3H |
| Adhesion | 100/100 | 90/100 | 80/100 |
| Impact strength | ○ | Δ | Δ |
| Solvent resistance | Δ | ○ | Δ |
| Sliding property | ○ | ○ | ○ |
| Abrasion resistance | Δ | Δ | ○ |
| Scratch resistance | Δ | Δ | Δ |
| Pencil hardness in 80° C. hot water | F | 5B | 2B |
| Physical properties after treating in retort | | | |
| Pencil hardness | 2H | 2B | 2H |
| Adhesion | 100/100 | 80/100 | 60/100 |
| Impact strength | ○ | Δ | Δ |
| Solvent resistance | X | Δ | Δ |
| Sliding property | ○ | Δ | Δ |
| Abrasion resistance | Δ | X | X |
| Scratch resistance | Δ | X | X |
| Pencil hardness in 80° C. hot water | B | 6B | 4B |
| Retort resistance | ○ | Δ | Δ |

As it is evident from the results shown in Tables 1 and 2, an amount of misting of the coating composition or printing composition for baking finish of the present invention was small, and a cured coating film obtained from the composition was excellent in physical (mechanical) properties and chemical properties both before and after treatment in retort. Further when ethylene oxide-modified acrylate was used, a hardness was increased remarkably.

On the other hand, in case of the organic solvent coating composition of Comparative Example 1 having a low content of solid, an amount of misting was large and environmental contamination actually occurred. Further physical properties of a cured coating film obtained therefrom were wholly lowered, and solvent resistance was inferior (particularly after treatment in retort). Also in case of the aqueous coating composition of Comparative Example 2, an amount of misting was much, and a cured coating film obtained therefrom was inferior in adhesion and impact resistance. Particularly physical properties after treatment in retort lowered significantly and water resistance was inferior. Further in case of the ultraviolet radiation curing coating composition of Comparative Example 3, though an amount of misting was small, required physical properties could not be obtained only by curing through ultraviolet radiation. Also even by baking, adhesion, solvent resistance and retort resistance (water resistance) were inferior.

The composition for baking finish of the present invention causes less misting at the time of coating or printing, and brings about less environmental contamination, and a cured coating film obtained therefrom is excellent in any of mechanical strength, water resistance, solvent resistance and adhesiveness.

What is claimed is:

1. A composition for coating and printing for baking finish, which contains one or two or more benzoguanamine compounds (A) having a radically polymerizable double bond and condensation-polymerizable functional group in its molecule and one or two or more radically polymerizable modified (meth)acrylate compounds (B), wherein the compound (A) is a compound represented by the formula (I):

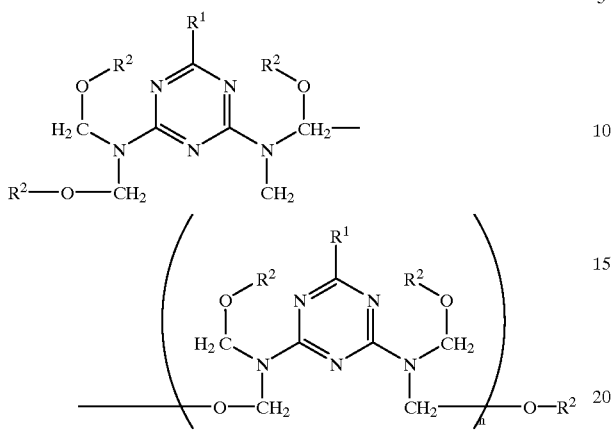

(I)

wherein $R^1$ is phenyl; $R^2$ is H, an alkyl group having 5 to 18 carbon atoms, cyclohexyl, phenyl or $R^3$, $R^4$ or $R^5$ described below; n is O or an integer of 1 to 3; provided that at least one of $R^2$ in one molecule is $R^3$, $R^4$ or $R^5$, in which $R^3$ is a group represented by the formula:

—X—OCO—CY=CH$_2$ in which Y is H or —CH$_3$; X is alkylene having 5 to 18 carbon atoms and a part or a whole of its hydrogen atoms may be substituted by halogen atom, $R^4$ is a group represented by the formula:

—(V—O)$_m$—Z—OCO—CY=CH$_2$ in which Y is as defined above; any of V and Z are a linear or cyclic alkylene group having 2 to 8 carbon atoms and a part or a whole of its hydrogen atoms may be substituted by halogen atom, m is an integer of 1 to 20, and $R^5$ is a group represented by the formula:

(W—COO)$_p$—Z—OCO—CY=CH$_2$ in which Y and Z are as defined above; W is a linear or cyclic alkylene group having 3 to 8 carbon atoms and a part or a whole of its hydrogen atoms may be substituted by halogen atom, p is an integer of 1 to 8, and the radically polymerizable modified (meth)acrylate compound (B) is (1) an alkyleneoxide-modified (meth)acrylate prepared by reacting (meth)acrylic acid with an alcohol having ethyleneoxide or propyleneoxide adduct, a carboxyalkylester-modified (meth)acrylate prepared by reacting a carboxyalkyl (meth)acrylate with an alcohol, an epoxy-modified (meth)acrylate prepared by reacting acrylic acid or methacrylic acid with an epoxy group of glycidyl ether of an alcohol, a (meth)acrylate having urethane bond and prepared by reacting a (meth)acrylate having hydroxyl with a compound having isocyanate group at its end or a mixture thereof; or (2) a (meth)acrylate-modified epoxy resin prepared by reacting (meth)acrylic acid with an epoxy resin, a (meth)acrylate-modified epoxy resin prepared by reacting (meth)acrylic acid to the epoxy resin modified by the above-mentioned alkyleneoxide or carboxylalkyl, a (meth)acrylate prepolymer or polymer having urethane bond and prepared by reacting a (meth)acrylate having hydroxyl with a compound having isocyanate group at its end, a (meth)acrylate-modified polyester prepared by reacting (meth)acrylic acid with a polyester, or a mixture thereof.

2. The composition of claim 1, wherein in the compound (A), one to five of $R^2$ in the formula (I) are any one or two or more of $R^3$, $R^4$ or $R^5$.

3. The composition of claim 1, wherein the compound (A) is a benzoguanamine acrylate resin, in which in the formula (I), Y in $R^3$, $R^4$ or $R^5$ is H.

4. The composition of claim 1, wherein the compound (A) is a benzoguanamine methacrylate resin, in which in the formula (I), Y in $R^3$, $R^4$ or $R^5$ is CH$_3$.

5. The composition of claim 1 containing an initiator for condensation polymerization.

6. The composition of claim 1 containing an initiator for radical polymerization.

7. The composition of claim 1 containing no solvent.

8. The composition of claim 1 containing at least one or a mixture of two or more of solvents in an amount of not more than 20% by weight.

9. The composition of claim 1 containing at least one or a mixture of two or more of reactive additives.

* * * * *